Feb. 22, 1966   C. JONES, JR., ETAL   3,236,277
WEDGE SPRING WASHER
Filed Nov. 21, 1963   2 Sheets-Sheet 1
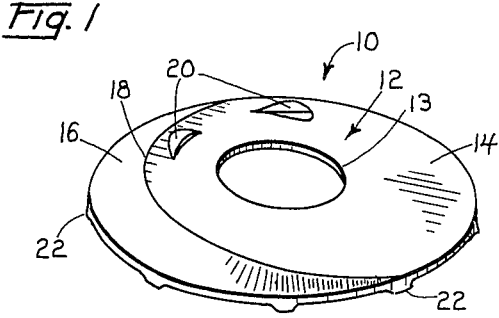
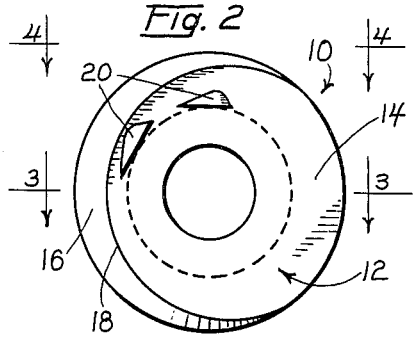
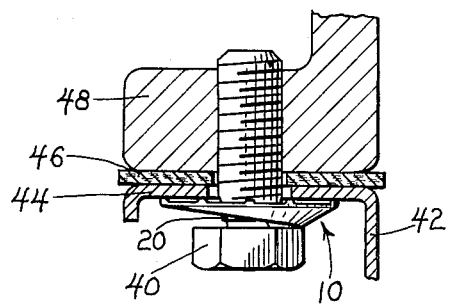
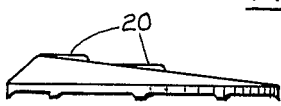
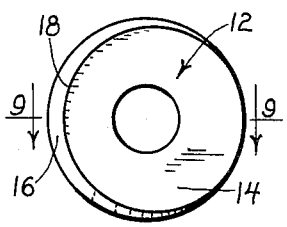
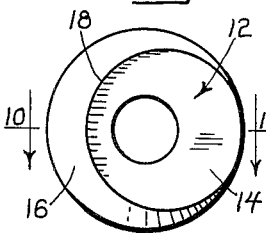
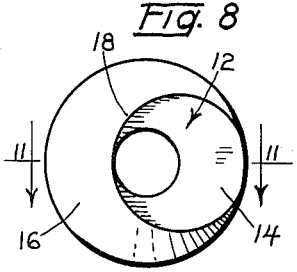
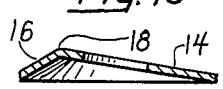
INVENTORS
Charles E. Gutshall
Chesley Jones, Jr.
BY
Robert W. Beart
Their Att'y

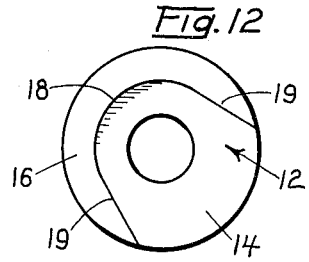
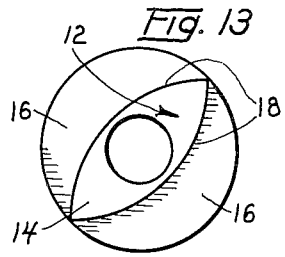
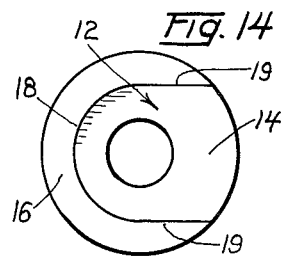
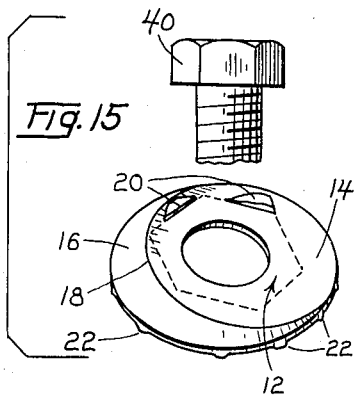
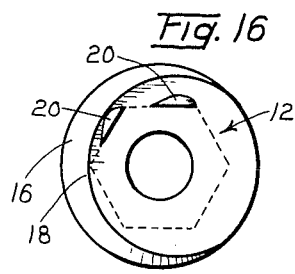
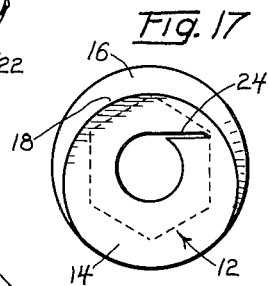
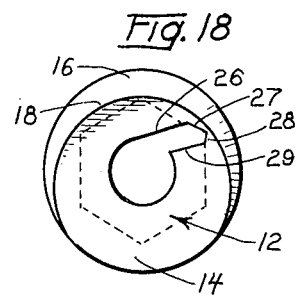
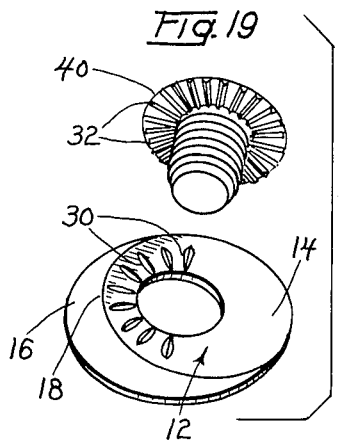
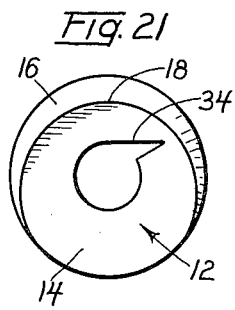
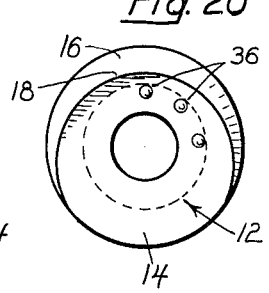

United States Patent Office 3,236,277
Patented Feb. 22, 1966

3,236,277
WEDGE SPRING WASHER
Chesley Jones, Jr., Barrington, and Charles E. Gutshall, Roselle, Ill., assignors to Illinois Tool Works Inc., Chicago, Ill., a corporation of Delaware
Filed Nov. 21, 1963, Ser. No. 325,404
8 Claims. (Cl. 151—38)

The present invention relates to a novel fastening device, and more particularly to a wedge spring washer as used in conjunction with a rotary fastener or the like.

Spring washers are commonly used to compensate for the relaxation of tension in a fastener assembly, the most common variety being a conical-shaped washer. Variations in the spring reactance or compressive resistance of conical-shaped washers are generally obtained by varying the material thickness, however, excessive cone heights may cause internal strains developing washer failure without materially adding to the washer spring action. Increasing the spring reactance by increasing the material thickness results in a higher cost, and limits the application of washers with a required spring reactance in cases, for example, where miniaturized parts are used. An effective solution to this problem is contemplated by the present invention which increases spring reactance or compressive resistance for a spring washer in a novel, effective and inexpensive manner.

A further difficulty with spring washers of the conical variety is that they are not generally provided with locking features other than friction. When they are compressed into a flattened condition, they are equivalent to a flat washer insofar as the locking action is concerned. Teeth may be provided on the marginal rim of the washer to penetrate a workpiece, and resist lateral shifting thereof; however, they do not add to the security of the associated rotary fastener. To overcome this, the present invention provides fastener security as well as preventing any lateral shifting of the washer.

One of the objects of the present invention is to increase the spring reactance or compressive resistance of a constantly biased washer while using much thinner materials than would normally be required.

Another object of the present invention is to increase the spring reactance or compressive resistance of a spring washer without increasing the material thickness.

A further object of the present invention is to provide a constantly biased washer with a novel means for increasing the spring reactance or compressive resistance of the washer.

Another object of the present invention is the provision of a novel configuration for a conical-shaped washer which will retain its spring characteristics when forced against a complementary workpiece by an outside force applying means in the form of a rotary fastener, and prevent loosening and withdrawal of the fastener.

Still another object of the present invention is the provision of a novel configuration for a substantially conical-shaped washer which is used in attaching a sheet metal flanged oil pan and gasket to the cast-iron block of engines, wherein the washer will retain its spring characteristics to counteract gasket set and prevent deformation of the oil pan flange.

A still further object of the present invention is to provide the above described washer with locking features which resist rotary and lateral shifting of the washer and rotary fastener associated therewith.

Another object of the present invention is the provision of a novel washer which has a simple construction, and can be easily and economically produced.

Other objects and advantages of the present invention will become apparent from the following description and accompanying drawings wherein:

FIG. 1 is an enlarged perspective view of the wedge spring washer incorporating the spring reactance and locking features of the present invention;

FIG. 2 is a top plan view of the washer shown in FIG. 1;

FIG. 3 is a cross sectional view of the washer taken along line 3—3 of FIG. 2;

FIG. 4 is an elevational view of the washer taken along line 4—4 of FIG. 2;

FIG. 5 is a side elevational view, partly in section, of the wedge spring washer as associated with a rotary fastener in attaching a sheet metal oil pan flange and gasket to a cast-iron engine block;

FIG. 6 is a top plan view of a modified form of the washer showing the washer crown closely situated in proximity to the marginal periphery of the washer;

FIG. 7 is a top plan view of another form of the washer with the crown substantially equidistant the marginal periphery and center of the washer along one-half thereof;

FIG. 8 is a top plan view showing still another form of the washer with the crown adjacent marginal portions surrounding an aperture formed in the washer;

FIG. 9 is a cross sectional view of the washer shown in FIG. 6 taken along line 9—9 of that figure;

FIG. 10 is a cross sectional view of the washer in FIG. 7 taken along line 10—10 of that figure;

FIG. 11 is a cross sectional view of the washer shown in FIG. 8 taken along line 11—11 of that figure;

FIG. 12 is a top plan view showing another modified form of the washer;

FIG. 13 is a top plan view showing still another form of the washer;

FIG. 14 is a top plan view showing yet another modified form of the washer;

FIG. 15 is a fragmentary perspective view of a washer similar to that shown in FIG. 1 as associated with a hexagonally-shaped rotary fastener prior to assembly;

FIG. 16 is a top plan view of the washer shown in FIG. 15;

FIG. 17 is a top plan view of the washer incorporating another type of locking feature;

FIG. 18 is a top plan view of the washer incorporating still another type of locking feature;

FIG. 19 is a perspective view of the washer having still another type of locking feature as associated with a rotary fastener;

FIG. 20 is a top plan view of the washer incorporating another type of locking feature;

FIG. 21 is a top plan view of the washer having yet another type of locking feature.

Referring now more specifically to the drawings wherein like parts are designated by the same numerals throughout the various figures, the washer 10 is shown in its preferred form in FIGS. 1-4, and generally comprises an arched body portion 12 having a pair of sloping surfaces 14, 16 separated by a curvilinear projection or crown 18 formed in the washer. Locking means 20, 22 are provided to resist retrograde movement of an associated fastener as will become more apparent hereinafter. The washer is preferably made from sheet metal, although plastic or other suitable material may be employed.

One of the many applications for the washer 10 of the present invention is in the attachment of sheet metal oil pans and gaskets to a cast-iron engine block as shown in FIG. 5. One of the difficulties that has been experienced in using spring washers of the type known in the art is that sheet metal pan "waves" will be formed between bolts which compress washers against the oil pan flange and gasket since pressures are not equal under all areas of the bolt head or washer. Further, the screw will not always be prevented from withdrawal since there are no locking features providing for bolt security. By using a washer contemplated by the present invention in the FIG. 5 environment, intermediate one end of a bolt 40 having a bolt head and the sheet metal oil pan flange 44 and gasket 46, the above described difficulties will be avoided, and the oil pan 42 will be securely attached to the engine block 48.

As best shown in FIGS. 1–4, the curvilinear projection or crown 18 of the washer is eccentrically positioned relative to the arched body portion 12 to provide a pair of curved downwardly sloping surfaces 14, 16 against which the rotary fastener will bear. Since the curvilinear projection 18 is designed to have an apical height greater than the remainder of the arched body portion, the bolt will be cocked when threaded to the engine block 48 so as to apply a diagonal force on the bearing areas of the screw threads. This will in turn prevent retrograde movement of the screw, and avoid the necessity of using an excessive cone height to strengthen the spring action of the washer. Using a curvilinear projection extending upwardly from a convex surface of the arched body portion as shown in the drawings will also require considerably more force to flatten the washer than if the separating ridge were a straight line. It has been found that a washer having such a configuration will provide more than twice the spring reactance with approximately half the set of a comparable conical washer. The separating ridge may take other forms and shapes as will presently appear.

When a washer is substantially flattened against a workpiece the marginal portions thereof will impinge upon the workpiece with an equalized pressure due to the fact that the load distributed from the rotary fastener to the washer will be applied to the marginal portions which are in engagement with the workpiece. This will substantially lessen permanent deformation of the oil pan flange 44, and prevent setting of the gasket 46 shown in FIG. 5.

While the spring reactance of the washer will prevent vibratory loosening of the rotary fastener, there is no assurance that the rotary fastener will be limited in its movement with the washer. Locking means 20, 22 have, therefore, been provided to further overcome the tendency of the rotary fastener to withdraw from the workpiece in the FIG. 1–4 embodiment. Locking means 22, which are in the form of teeth or protuberances of any shape or configuration, are designed to prevent lateral shifting of the washer by penetrating a workpiece such as oil pan flange 44. The locking means 20 are formed on the arched body portion 12, and are used in conjunction with the teeth 22 to secure the rotary fastener to the washer and prevent fastener retrograde movement. It is to be noted that the locking means of flats 20 shown in FIGS. 1–4 are slightly inclined, but have a substantially flat rotary fastener engaging surface which secures the fastener to the washer by a wedging action. When the washer is compressed, the locking means 20 will wedge against the undersurface of the rotary fastener and prevent movement thereof. Thus, the locking features and spring reactance of the present washer will overcome many problems heretofore encountered in the spring washer art in a novel and effective manner.

FIGS. 6–11 show modified forms of the spring reactance feature taught by the present invention. In FIGS. 6 and 9, the curvilinear projection or crown 18, while eccentrically positioned relative to the arched body portion 12, is positioned in close proximity to the marginal periphery of the washer, thereby reducing the area of the curved surface portion 16. In FIGS. 7 and 10, the curvilinear projection is positioned substantially equidistant the marginal periphery and center of the washer along one-half thereof, while in FIGS. 8 and 11, the curvilinear projection 18 is reduced in size and borders upon the apertures of the washer at one discrete location thereof. Varying degrees of spring reactance can be obtained by using a curvilinear projection having forms just previously described, and it may be possible to incorporate several of these forms within the confines of these washers to increase the stages of compression.

Most of the discussion about the spring reactance feature so far has centered upon a projection formed on the washer having a continuously curving design. FIGS. 12 and 14 have been included in the drawings to show that substantially straight line projections may be used in conjunction with a curvilinear projection to increase the spring reactance of a washer. The straight line projections 19 employed in FIG. 12 are angularly offset from one another, while the straight line projections in FIG. 14 are substantially parallel to one another. It is also to be noted that substantially identical curvilinear or other projections may be used on opposite sides of the washer aperture as indicated in FIG. 13 to increase the compressive resistance of the washer or the stages of compression.

Other types of locking features for securing the rotary fastener to the washer are shown in FIGS. 15–21. Where a hexagonal-shaped rotary fastener is used, the flats 20 will be positioned on the arched body portion in substantially the manner shown in FIG. 15. The dotted lines shown on the arched body portion 12 represent the shape of the rotary fastener which is used in conjunction therewith, and the flats are positioned in close proximity to the dotted line configuration to prevent removal of the rotary fastener.

FIGS. 17–18 and 21 show various forms of slots which may be employed to engage surfaces on the rotary fastener. The slot locking means 24 shown in FIG. 17 will provide at least one upstanding rib portion adjacent the slot for engaging a polygonal-shaped rotary fastener when the washer has been compressed thereby. The slot may be extended to a notch configuration 34 as shown in FIG. 21, either of these forms being adapted to engage the undersurface or side faces of the rotary fastener as will be readily apparent. In FIG. 18, the slot locking means is provided with an irregular configuration. Edge 27 bordering on this slot is substantially parallel to the curvilinear projection 18 and extends slightly beyond the dotted line configuration of the rotary fastener outline shown in that figure. Extending substantially along a portion of the dotted line outline, an edge 28 is provided. Edges 26 and 29 are substantially parallel to each other, the upper one of which is tangent to the washer aperture, to define the remainder of the slot locking means. Once the washer is compressed and substantially flattened, one of the corners of the hexagonal-shaped rotary fastener will abut edge 27 which will be positioned above the plane of the flat undersurface of the rotary fastener due to the inclination of sloping surface 14. Therefore, the rotary fastener will abut edge 27 and resist further retrograde movement of the fastener.

Radial serrations 30 or raised lobes 36 may be positioned in semi-circular fashion on the curved surface 14 of the arched body portion 12 adjacent the curvilinear projection to engage complementary grooves formed on the undersurface of the rotary member as shown in FIGS. 19 and 20. The grooves 32 shown in FIG. 19 will be in substantial horizontal alignment with the radial serrations 30 when the washer is compressed to rest therewithin and lock the rotary fastener against movement. Similarly, depressions may be formed in the undersurface of the rotary fastener to cooperate with the raised lobes 36 of FIG. 20 and prevent fastener movement in the same manner as the FIG. 19 embodiment.

From the foregoing, it will now be apparent that the washer is provided with novel spring reactance and locking features which will increase the compressive resistance of the washer to provide a greater initial resistance to compression than comparable conical spring washers, and will substantialy hinder or prevent fastener movement when the washer is compressed thereby. The washer is preferably provided with a circular configuration as shown in the drawings to produce a relatively equalized pressure against an opposing workpiece throughout marginal portions of said washer when the washer is substantially flattened, although other forms and shapes may be used to accomplish the same result. The various forms of spring reactance and locking features, and the conical sape of the washers shown in the drawings are used for illustrative purposes only, and are not to be interpreted as restricting the invention to these forms. Washers having a semi-spherical, parabolic or other arched shape may be used in conjunction with any curvilinear projection and locking means which will strengthen the compressive resistance of the washer and provide for fastener security in the manner described above.

While several embodiments of the present invention have been shown and described herein, it is obvious that they may be changed without departing from the spirit and scope of the appended claims.

We claim:

1. A resilient one-piece apertured washer including a first arched body portion with a continuous outer margin which lies substantially in a single plane and forms the base and outer margin of said washer body, said first arched body portion being a substantially conical surface of revolution formed by rotating a line disposed at an acute angle to the base about the axis of the washer, said line being selected from limits of straight to slightly convex outwardly relative to the axis of rotation, said first arched body portion being of substantially uniform configuration in cross-section such that if said arched body portion were an uninterrupted surface all oppositely arranged surfaces in cross-section relative to the axis of said body and relative to the plane of said base would be substantially symmetrical, said outer margin lying in and defining the base of said surface of revolution, a second body portion of planar configuration eccentrically positioned on and angularly disposed relative to said first arched body portion, said second portion forming an included angle between itself and the plane base through said outer margin smaller than the included angle between said arched body portion and said plane, said planar body portion encompassing an aperture in said washer, said aperture being concentric relative to the continuous outer margin of the washer body and eccentric to the outer margins of said planar portion, the juncture between said arched and planar body portions forming a curvilinear projection a portion of which has an apical height greater than the remainder of the arched body portion for strengthening the compressive resistance of said washer when subjected to a compressive force, said washer being so constructed that when utilized between two surfaces movable axially relative to the axis of the washer said curvilinear projection and said base will be the first portions of the washer engaged by said movable surfaces.

2. A washer of the type set forth in claim 1 wherein said curvilinear projection is circular and positioned on said arched body portion entirely within its outer planar margin.

3. A device of the type set forth in claim 1 wherein said planar portion is defined by a curvilinear ridge portion at its peak relative to the plane passing through the base of said washer body and by oppositely disposed ridge portions extending from said curvilinear ridge portion which extend outwardly to the base of said washer body.

4. A device of the type claimed in claim 3 wherein oppositely disposed ridge portions are substantially parallel to each other.

5. A device of the type claimed in claim 3 wherein oppositely disposed ridge portions diverge relative to each other as they extend from opposite ends of side curvilinear ridge portions toward the base of said washer body.

6. A device of the type claimed in claim 1 wherein said first arched body portion is frusto-conical in configuration.

7. A device of the type set forth in claim 1 wherein said washer base is provided with locking means which extend outwardly relative to said washer body base and form means to impinge upon and imbed themselves in a complementary workpiece with which the washer is associated for preventing rotation.

8. A device of the type claimed in claim 1 wherein said planar body portion of said washer is provided with axially upwardly extending locking means to provide locking engagement with a complementary fastener with which said washer is adapted to be associated.

References Cited by the Examiner

UNITED STATES PATENTS

| | | | |
|---|---|---|---|
| 673,032 | 4/1901 | Servis | 151—38 |
| 843,720 | 2/1907 | Waddell et al. | 151—35 |
| 1,854,277 | 4/1932 | Schatz | 151—38 |
| 2,278,062 | 3/1942 | Dekoharovich | 151—38 |
| 2,779,376 | 1/1957 | Poupitch | 151—38 |
| 3,181,584 | 5/1965 | Borowsky | 151—38 |

FOREIGN PATENTS

| | | |
|---|---|---|
| 144 | 3/1899 | Austria. |
| 14,455 | 5/1903 | Great Britain. |
| 13,754 | 6/1907 | Great Britain. |

CARL W. TOMLIN, *Primary Examiner.*

R. S. BRITTS, *Assistant Examiner.*